Oct. 2, 1928.  
L. C. WETZEL  
1,685,793  
WEIGHING SCALE  
Filed Sept. 28, 1925
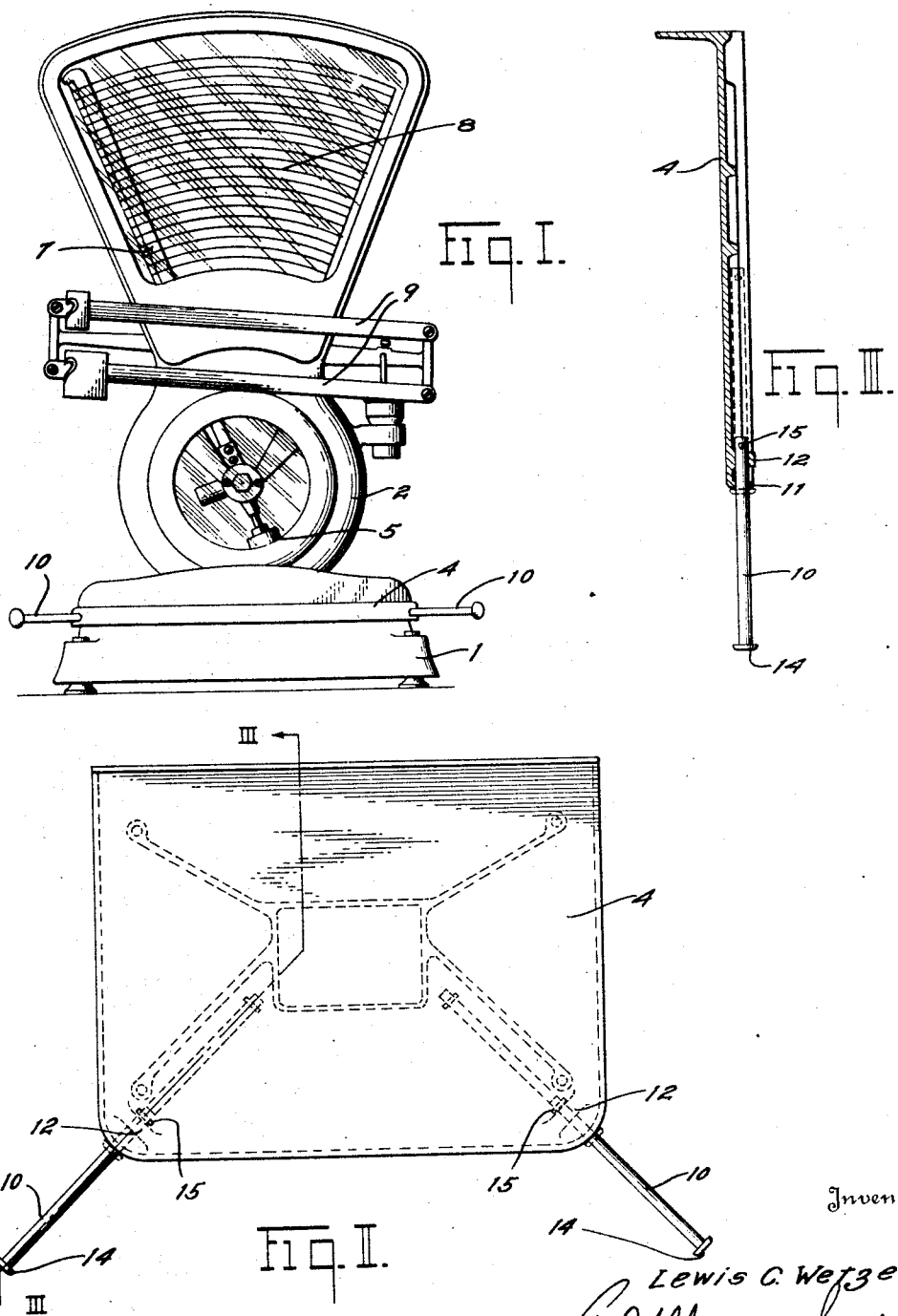

Patented Oct. 2, 1928.

1,685,793

UNITED STATES PATENT OFFICE.

LEWIS C. WETZEL, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed September 28, 1925. Serial No. 58,962.

This invention relates to weighing scales, and more particularly to extension devices for use with the commodity receiver or platform of the scale.

One of principal objects of the invention is the provision of an extension device for use in conjunction with the usual load receiving platform to assist in supporting loads of unwieldy proportions which may not practicably be supported upon the scale platform per se.

Another object of the invention is the provision of an extension means for a weighing scale platform to assist in supporting loads of unweildy and bulky proportions, the extensible means being entirely supported by said platform and forming a normal part of the initial load upon the platform supporting levers.

A further object is to provide a type of extension load supporting means for a scale platform which may when not in use be slidably moved to a position normally out of the way of the operator and substantially obscured from view beneath the platform.

Still another object is the provision of a supplemental load support which may be readily and quickly extended from its out-of-the-way position to a position of use.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a front elevational view of a weighing scale of a well known type embodying my invention;

Figure II is an enlarged top plan view of the scale platform incorporating the supplemental load support of my invention;

Figure III is a sectional view through the scale platform taken substantially on the line III—III of Figure II.

Referring to the drawings in detail, I have shown the device of my invention as incorporated in a scale of the counter type, and as my invention forms no part of the weighing mechanism per se, I will only describe it in such detail as to show the application of my invention thereto.

The scale consists of a substantially rectangular base 1 upon one end of which is erected a housing 2 having a fan-shaped upper portion. Supported within the base 1 is a lever system (not shown) adapted to support a commodity receiving platform 4, the levers being suitably connected to a load counterbalancing pendulum 5 pivotally supported within the housing 2. The weight indicating means consists of an indicating hand 7 fixedly secured to the pendulum 5 and is adapted to co-operate with a chart 8 located in the fan-shaped upper portion of the housing 2. A pair of beams 9 are operatively connected to the platform lever mechanism and are provided with suitable poises for increasing the normal capacity of the scale.

In the operation of the scale a load placed upon the platform exerts a downward force upon the platform lever mechanism and causes the pendulum 5 to be moved to a load counterbalancing position and the indicating hand 7 to swing over the chart 8 to indicate the weight of the load.

It is a usual occurrence in business establishments, packing companies, hardware houses, etc, that commodities or articles must be weighed which are of such unwieldy and bulky proportions that the the ordinary load receiving platform of the scale is not adequate to accommodate such articles. I have, therefore, obviated these difficulties by providing a supplemental load supporting means comprising a pair of extensible rods 10. Each rod 10 is slidably positioned in an opening in the depending flange 11 of the platform 4 and a bore in a depending boss 12, the flange and bosses providing suitable bearings for supporting the rods. Each rod 10 is also provided at one end with a head 14 and at the other end with transversely positioned pins 15 to prevent the disassembly of the rods and the platform.

When a supplemental load support is desirable the rods 10 may be extended to the position particularly illustrated in full lines in Figure II, the rods projecting diagonally from the forward corners of the platform. When it becomes necessary to dispense with the use of such supplemental load support the rods may be slidably moved to a stored or out-of-the-way position beneath the platform, as indicated by the dotted lines in Figures II and III, the heads 14 of the rods preventing further inward movement thereof.

It will be apparent that the relative positions of the rods 10 will have no effect whatever upon the weighing accuracy of the scale, as the weight of the rods forms part of the initial load upon the platform lever mechanism.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, weighing mechanism including a load receiving platform, said platform being adapted to receive a supplemental load support, a supplemental load support comprising a plurality of rods and means whereby said rods may be extended from said platform in divergent directions to assist in supporting a load upon the load receiving platform.

2. In a device of the class described, in combination, weighing mechanism including a load receiving platform, and a supplemental load support comprising a plurality of rods and means by which said rods are slidably secured to said platform whereby said rods may be extended in divergent directions from a stored position beneath the platform to a projecting position of use.

3. In a device of the class described, in combination, weighing mechanism including a load receiving platform, a supplemental load support comprising a plurality of rods and means by which said rods are slidably secured to said platform and normally positioned beneath the platform, and means whereby said rods may be extended in divergent directions to a projecting position of use to assist in supporting a load upon the load receiving platform, and means secured to said rods to limit the relative movement thereof.

4. In a device of the class described, in combination, weighing mechanism including a load receiving platform, said platform being adapted to receive a supplemental load support, and a supplemental load support comprising a pair of rods and means by which said rods are adapted to be slidably extended from a stored position beneath the platform to a projecting position of use, the longitudinal axes of movement of said rods being substantially at right angles to each other.

5. In a device of the class described, in combination, weighing mechanism including a load receiving platform, said platform being adapted to receive a supplemental load support, a supplemental load support comprising a pair of rods and means by which said rods are adapted to be slidably extended from a stored position beneath the platform to a projecting position of use, the longitudinal axes of movement of said rods being substantially at right angles to each other, and means secured to said rods and engageable with said platform to limit the relative movement of said rods.

LEWIS C. WETZEL.